(12) United States Patent
Furuta et al.

(10) Patent No.: US 11,385,198 B2
(45) Date of Patent: Jul. 12, 2022

(54) SENSOR ELEMENT AND GAS SENSOR

(71) Applicant: NGK SPARK PLUG CO., LTD., Nagoya (JP)

(72) Inventors: Hitoshi Furuta, Nagoya (JP); Akinori Kojima, Nagoya (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 496 days.

(21) Appl. No.: 16/401,136

(22) Filed: May 2, 2019

(65) Prior Publication Data
US 2019/0353611 A1 Nov. 21, 2019

(30) Foreign Application Priority Data

May 21, 2018 (JP) .............................. JP2018-096780
Feb. 5, 2019 (JP) .............................. JP2019-018400

(51) Int. Cl.
*G01N 27/407* (2006.01)
*G01N 27/409* (2006.01)
*G01N 27/406* (2006.01)

(52) U.S. Cl.
CPC ....... *G01N 27/4077* (2013.01); *G01N 27/409* (2013.01); *G01N 27/4062* (2013.01); *G01N 27/4071* (2013.01)

(58) Field of Classification Search
CPC ............. G01N 27/4071; G01N 27/419; G01N 27/4062; G01N 27/4074; G01N 27/4075; G01N 27/4077; G01N 27/41; G01N 27/417; G01N 33/0027; G01N 33/0036; F01N 13/008; F02M 35/10373; Y10T 29/49227
See application file for complete search history.

(56) References Cited

U.S. PATENT DOCUMENTS

| 6,235,174 B1 * | 5/2001 | Jaurnig ................ G01N 27/407 204/426 |
| 2008/0067067 A1 * | 3/2008 | Oya ..................... G01N 27/419 204/426 |
| 2010/0264027 A1 * | 10/2010 | Nakagawa ......... G01N 27/4071 204/431 |
| 2015/0323492 A1 * | 11/2015 | Mizutani ............ G01N 27/4062 204/424 |

(Continued)

FOREIGN PATENT DOCUMENTS

| DE | 102017211498 A1 * | 1/2018 | ......... G01N 27/4062 |
| JP | 2015-232551 A | 12/2015 | |

*Primary Examiner* — Nimeshkumar D Patel
*Assistant Examiner* — Gedeon M Kidanu
(74) *Attorney, Agent, or Firm* — Sughrue Mion, PLLC

(57) ABSTRACT

A sensor element includes: three electrode pads provided on the first main surface, and electrically connected to a connection terminal, the three electrode pads including; a pad group including two electrode pads which are arranged in a widthwise direction of the sensor element, and a single pad which is not overlapped with the pad group when viewed in a widthwise direction, the single pad including a main body portion which has a width greater than a clearance between the two electrode pads of the pad group, which is electrically connected to the connection terminal, and a connection portion which is connected to a conductor formed within a through hole extending within the sensor element in a thickness direction, and which is adjacent to a side surface of the main body portion.

9 Claims, 6 Drawing Sheets

(56) References Cited

U.S. PATENT DOCUMENTS

2016/0084787 A1* 3/2016 Ahn ................... H05B 3/262
  73/31.06
2016/0202226 A1* 7/2016 Yonezu .............. G01N 33/0036
  73/23.32

* cited by examiner

SENSOR ELEMENT AND GAS SENSOR

BACKGROUND OF THE INVENTION

The present invention relates to a sensor element and a gas sensor which are arranged to sense a gas concentration of a specified gas included in a combustion gas and an exhaust gas of a combustor, an internal combustion engine and so on.

Conventionally, there has been used a gas sensor arranged to sense a concentration of a specified component (oxygen and so on) in an exhaust gas of an internal combustion engine. As this gas sensor, there has been known a configuration including a plate-shaped sensor element (cf. Japanese Patent Application No. 2015-232551). For taking out a detection output from a sensing cell of a sensor element, and controlling a pump current of a pumping cell, an electrode constituting the cell is connected through a through hole conductor to an electrode pad on a surface of the sensor element.

By the way, in case of a wide-range (full-range) air-fuel ratio sensor element and NOx sensor element, there are two or more cells. Moreover, there is an electrode pad for energizing a heater. Accordingly, as shown in FIG. 7, electrode pads 1100, 1110, and 1120 are often formed on one surface of front and back surfaces of a sensor element 1000.

In this case, in a case where the three electrode pads 1100, 1110, and 1120 are arranged in widthwise direction on the one surface 1000a of the sensor element 1000, it is not possible to sufficiently ensure distances between the electrode pads. Accordingly, connection terminals connected, respectively, to the electrode pads are short-circuited to each other. Therefore, two electrode pads 1100 and 1110 are arranged in the widthwise direction to be apart from each other in the widthwise direction. The electrode pad 1120 is disposed on a rear end side of the electrode pads 1100 and 1110.

Moreover, through hole conductors 1200 within the sensor element 1000 are overlapped with and connected to connection portions 1100c, 1110c, and 1120c of the electrode pads 1100, 1110, and 1120.

By the way, the electrode pads 1100 and 1120 are arranged in a longitudinal direction in a direction of an axis O of the sensor element 1000. Accordingly, an entire length Lx of the electrode pads 1100, 1110, and 1120 becomes long. With this, it is not possible to attain length reduction and size reduction of the sensor element.

On the other hand, the connection portion 1120c of the electrode pad 1120 is formed on the through hole conductor 1200, so that there is generated a stepped portion between the surface of the electrode pad 1120 and the connection portion 1120c of the electrode pad 1120. With this, a connection terminal (not shown) arranged to be slidably moved in an arrow F with respect to the electrode pad 1120 in the direction of the axis O is difficult to be surely abutted on the connection portion 1120c. The connection portion 1120c does not effectively function as the electrode. There is generated a waste space by the area of the connection portion 1120c in the direction of the axis O. Accordingly, in a case where the connection portion 1120c at a tip end of the electrode pad 1120 is positioned on a front side between the electrode pads 1100 and 1110 so as to be overlapped with the electrode pads 1100 and 1110 in the direction of the axis O, it is possible to decrease the entire length Lx.

However, in this case, a distance G between the through hole conductor 1200 and the electrode pad 1100 (1110) becomes short, so that the through hole conductor 1200 and the electrode pad 1100 may be short-circuited. That is, in general, the through hole conductor 1200 is formed by filling a conductive paste in the through hole by evacuating (vacuuming). In this case, the conductive paste is dispersed around the through hole. In a case where the distance G is too short, the conductive paste is short-circuited with the electrode pad 1100 (1110). Accordingly, a tip end of the electrode pad 1120 needs to be separated from rear ends of the electrode pads 1100 and 1110 in the direction of the axis, so as to ensure the distance G. With this, it is not possible to decrease the length Lx. In a case of a via hole, these problems are caused, in place of the through hole conductor 1200. That is, when the conductive paste is filled within the via hole, the conductive paste protrude around the via hole. With this, the conductive paste may be short-circuited with the electrode pad 1100 (1110) when the distance G is too short.

SUMMARY OF THE INVENTION

It is, therefore, an object of the present invention to provide a sensor element and a gas sensor which includes three electrode pads disposed on at least one surface of the sensor element, and which is devised to attain length reduction of the sensor element, to ensure a reliability of an electric connection between electric pads and connection terminals, and to suppress short-circuit between the electrode pads.

According to one aspect of the present invention, a sensor element which extends in a plate shape in a direction of an axis, and which has a first main surface and a second main surface, the sensor element comprises: three electrode pads provided on at least the first main surface, and electrically connected to a connection terminal, the three electrode pads including; a pad group including two electrode pads of the three electrode pads which are arranged in a widthwise direction of the sensor element, and a single pad which is provided on a tip end side or rear end side of the pad group, and which is not overlapped with the pad group when viewed in a widthwise direction, the single pad including a main body portion which has a width greater than a clearance between the two electrode pads of the pad group, which is electrically connected to the connection terminal, and a connection portion which is connected to a conductor formed within a through hole extending within the sensor element in a thickness direction, and which is adjacent to a side surface of the main body portion.

According to another aspect of the present invention, a sensor element which extends in a plate shape in a direction of an axis, and which has a first main surface and a second main surface, the sensor element comprises: three electrode pads provided on at least the first main surface, and electrically connected to a connection terminal, the three electrode pads including; a pad group including two electrode pads of the three electrode pads which are arranged in a widthwise direction of the sensor element, and a single pad which is provided on a tip end side or rear end side of the pad group, and which is not overlapped with the pad group when viewed in a widthwise direction, the single pad including which has a width greater than a clearance between the two electrode pads of the pad group, and which is connected to a conductor formed within a through hole extending within the sensor element in a thickness direction, wherein the sensor element satisfies L1>L2 where L1 is a shorter one of the widths of the electrode pads of the pad group in the direction of the axis, and L2 is a length of the single pad in the direction of the axis, and wherein the through hole is not overlapped with a center of the single pad in the widthwise direction.

According to still another aspect of the present invention, a gas sensor comprises: a sensor element which extends in a plate shape in a direction of an axis, and which has a first main surface and a second main surface; and a main shell supporting the sensor element, the sensor element comprising: three electrode pads provided on at least the first main surface, and electrically connected to a connection terminal, the three electrode pads including; a pad group including two electrode pads of the three electrode pads which are arranged in a widthwise direction of the sensor element, and a single pad which is provided on a tip end side or rear end side of the pad group, and which is not overlapped with the pad group when viewed in a widthwise direction, the single pad including a main body portion which has a width greater than a clearance between the two electrode pads of the pad group, which is electrically connected to the connection terminal, and a connection portion which is connected to a conductor formed within a through hole extending within the sensor element in a thickness direction, and which is adjacent to a side surface of the main body portion.

According to still another aspect of the present invention, a gas sensor comprises: a sensor element which extends in a plate shape in a direction of an axis, and which has a first main surface and a second main surface; and a main shell supporting the sensor element, the sensor element including: three electrode pads provided on at least the first main surface, and electrically connected to a connection terminal, the three electrode pads including; a pad group including two electrode pads of the three electrode pads which are arranged in a widthwise direction of the sensor element, and a single pad which is provided on a tip end side or rear end side of the pad group, and which is not overlapped with the pad group when viewed in a widthwise direction, the single pad including which has a width greater than a clearance between the two electrode pads of the pad group, and which is connected to a conductor formed within a through hole extending within the sensor element in a thickness direction, wherein the sensor element satisfies L1>L2 where L1 is a shorter one of the widths of the electrode pads of the pad group in the direction of the axis, and L2 is a length of the single pad in the direction of the axis, and wherein the through hole is not overlapped with a center of the single pad in the widthwise direction.

DETAILED DESCRIPTION OF THE INVENTION

Figure 1:
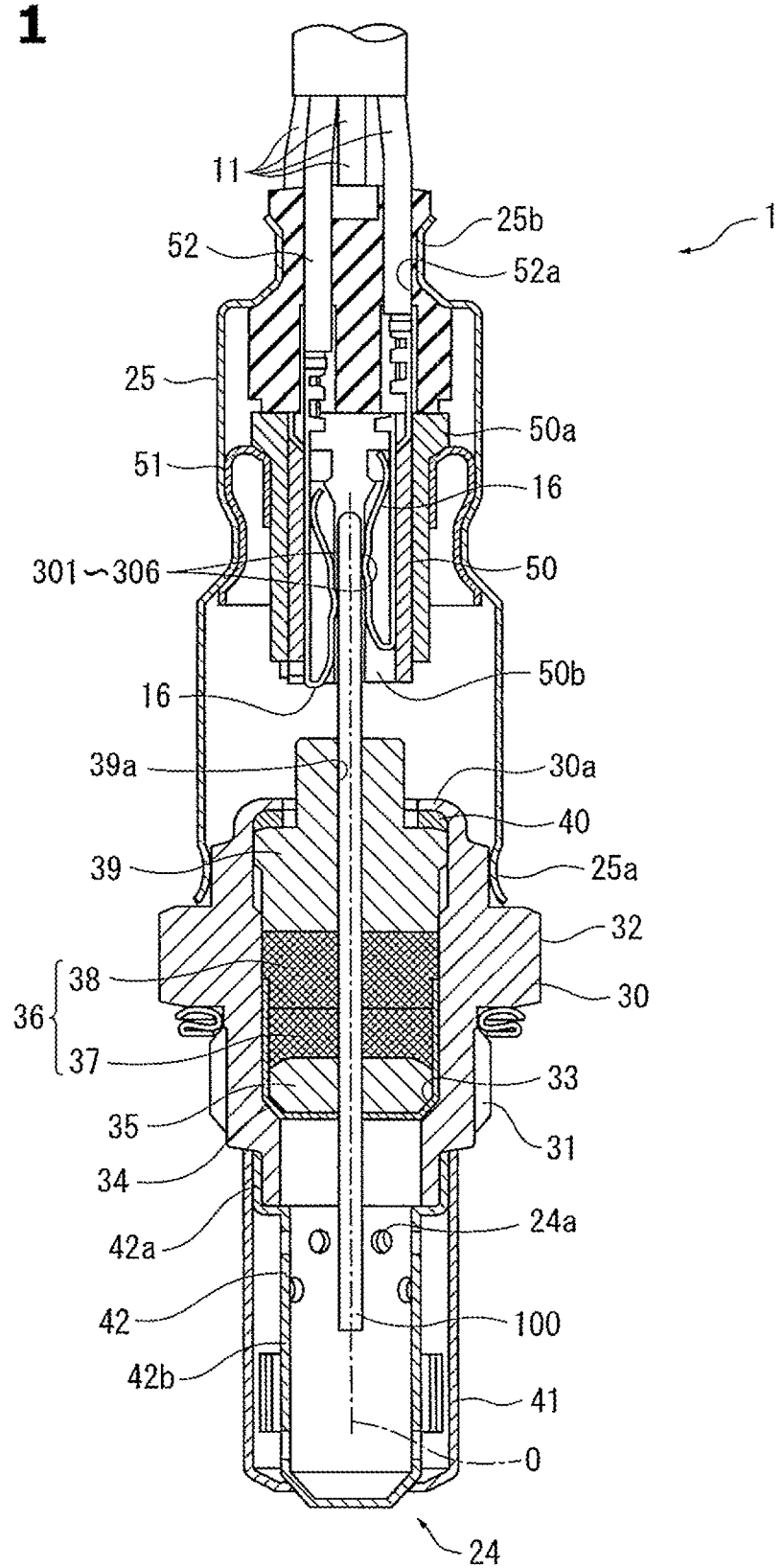
FIG. 1 is a sectional view which shows a gas sensor (oxygen sensor) according to embodiments of the present invention, and which is taken along a direction of an axis of the gas sensor.
Figure 2:
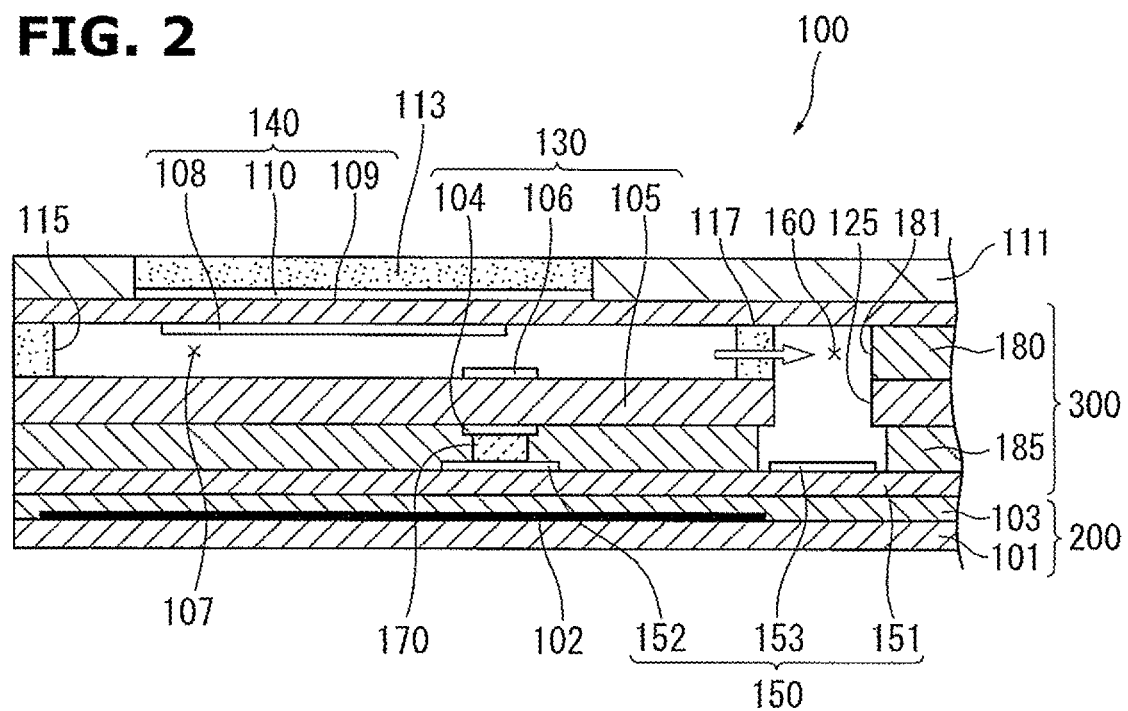
FIG. 2 is a sectional view which shows the sensor element, and which is taken along the direction of the axis of the gas sensor.

Hereinafter, embodiments according to the present invention are explained. FIG. 1 is a sectional view which shows a gas sensor (NOx sensor) according to the present invention, and which is taken along a longitudinal direction (direction of an axis O) of the gas sensor. FIG. 2 is a sectional view which shows a sensor element 100, and which is taken along the direction of the axis O.

As shown in FIG. 1, the gas sensor 1 includes a sensor element (NOx sensor element) 100; a metal shell 30 receiving and holding therein the sensor element 100 and so on; a protector 24 mounted to a tip end portion of the metal shell 30, and so on. The sensor 100 is disposed to extend in the direction of the axis O.

The metal shell 30 is made from SUS (stainless steel) 430. The metal shell 30 includes an external screw portion 31 for mounting the gas sensor to an exhaust pipe; and a hexagonal portion 32 to which a mounting tool is set at a mounting operation. Moreover, the metal shell 30 includes a shell side stepped portion 33 extending in a radially inward direction. This metal shell side stepped portion 33 supports a metal holder 34 arranged to hold the sensor element 100.

A ceramic holder 35 and a talc 36 are disposed within this metal holder 34 in this order from the tip end side. This talc 36 includes a first talc 37 disposed within the metal holder 34; and a second talc 38 disposed over a rear end of the metal holder 34.

The first talc 37 is compressed and filled within the metal holder 34. With this, the sensor element 100 is fixed to the metal holder 34. Moreover, the second talc 38 is compressed and filled within the metal shell 30. With this, the sealing characteristic between an outer surface of the sensor element 100 and an inner surface of the metal shell 30 is ensured.

A sleeve 39 made from alumina is disposed on a rear end side of the second talc 38. This sleeve 39 has a cylindrical multi stepped shape. The sleeve 39 includes an axial hole 39a extending in the direction of the axis O. The sensor element 100 is inserted within the axial hole 39a of the sleeve 39. The metal shell 30 includes a swaging portion 30a which is a rear end portion of the metal shell 30, and which is inwardly bent. With this, the sleeve 39 is pressed through a ring member 40 made from stainless, toward the tip end side of the metal shell 30.

The protector 24 made from metal is mounted, by welding, to (on) an outer circumference of the tip end portion of the metal shell 30. The protector 24 covers the tip end portion of the sensor element 100 protruding from the tip end of the metal shell 30. The protector 24 includes a plurality of gas intake holes 24a. This protector 24 has a double structure. The protector 24 includes an outer protector 41 which is located on an outer side, and which has a bottomed cylindrical shape having a uniform outside diameter; and an inner protector 42 which is located on an inner side, which has a bottomed cylindrical shape, and which has a rear end portion 42a having an outside diameter larger than an outside diameter of a tip end portion 42b.

On the other hand, an outer cylinder 25 made from SUS 430 is mounted on the rear end portion of the metal shell 30. This outer cylinder 25 includes a tip end portion 25a which has a large diameter, which is located on the tip end side, and which is fixed to the metal shell 30 by the laser welding and so on. A separator 50 is disposed within the rear end portion of the outer cylinder 25. A holding member 51 is disposed within a clearance between the separator 50 and the outer cylinder 25. This holding member 51 is engaged with a protruding portion 50a (described later) of the separator 50. The holding member 51 is fixed by the outer cylinder 25 and the separator 50 by swaging the outer cylinder 25.

Furthermore, the separator 50 includes an insertion hole 50b which penetrates through the separator 50 from a tip end side to a rear end side, and which receives six lead lines 11 of the sensor element 100 (besides, only four lead lines 11 are shown in FIG. 1). A connection terminal 16 is received within the insertion hole 50b. The connection terminal 16 connects the lead lines 11 and electrode pads 301 to 306 (cf. FIGS. 4A and 4B) of the sensor element 100. Each of the lead lines 11 is connected to a connector (not shown) in an outside. The lead lines 11 and outside devices such as an ECU interchanges electric signals though this connector. Moreover, each of the lead lines 11 is formed by covering a lead wire (conductor) with insulating film made from the resin. A tip end of the lead line 11 whose the insulating film is removed is crimped to a rear end of the connection terminal 16.

Moreover, a substantially cylindrical rubber cap 52 is disposed on a rear end side of the separator 50. The rubber cap 52 closes an opening portion 25b of the outer cylinder 25 which is located on a rear end side of the outer cylinder 25. In a state where the rubber cap 52 is mounted in the rear end of the outer cylinder 25, the outer circumference of the outer cylinder 25 is swaged in the radially inward direction. With this, the rubber cap 52 is fixed to the outer cylinder 25. The rubber cap 52 includes insertion holes 52a each of which penetrates from the tip end side to the rear end side, and each of which receives the lead lines 11.

As shown in FIG. 2, the sensor element (Nox sensor element) 100 has a long narrow plate shape. The sensor element 100 has a layered structure having three layered solid electrolyte members 109, 105, and 151 each having a plate shape; and insulating members 180 and 185 which are made from alumina and so on, and which are sandwiched, respectively, between the solid electrolyte members 109 and 105, and between the solid electrolyte members 105 and 151. This layered structure constitutes a sensing element section 300. Moreover, a heater section 200 is provided on an outer side (on a lower side in FIG. 2) of the solid electrolyte member 151. The heating section 200 includes sheet-shaped insulating layers 103 and 101 made mainly from the alumina, and stacked on the outer side of the solid electrolyte member 151; and a heating portion 102 which is a heater pattern made mainly from Pt, and which is embedded between the insulating layers 103 and 101.

The sensing element section 300 includes an (first) oxygen pumping cell (Ip1 cell) 140, an oxygen concentration sensing cell (Vs cell) 130, and a second pumping cell (Ip2 cell) 150.

As shown in FIG. 2, the oxygen pumping cell 140 includes the second solid electrolyte member 109; and a third electrode 108 and a fourth electrode 110 formed on both surfaces of the second solid electrolyte member 109. The oxygen concentration sensing cell 130 includes the first solid electrolyte member 105; and a first electrode 104 and a second electrode 106 formed on both surfaces of the first solid electrolyte member 105. Moreover, a hollow measuring chamber 107 which is a small space is formed between the solid electrolyte member 109 and the solid electrolyte member 105. The second electrode 106 and the third electrode 108 are disposed within the measuring chamber 107. The measuring chamber 107 is connected to the outside on a tip end side (on a left side in FIG. 2). A diffusion controlling portion 115 is disposed at this connection portion.

A protection layer 111 is formed on a surface of the second solid electrolyte member 109 to sandwich the fourth electrode 110. The protection layer 111 is hollowed out at a portion covering the fourth electrode 110. A porous electrode protection layer 113 is embedded in this hollowed-out portion.

The oxygen concentration sensing cell 130 is arranged to produce electromotive force in accordance with an oxygen partial pressure difference between the measuring chamber 107 and a reference oxygen chamber 170 described later. The oxygen pumping cell 140 is arranged to pump the oxygen into and out the measuring chamber 107.

Moreover, a second diffusion resistance portion 117 is provided to the measuring chamber 107 on the rear end side (on a right side in FIG. 2) of the sensor element 100. The second diffusion resistance portion 117 is arranged to partition a second measuring chamber (NOx measuring chamber) 160 and the measuring chamber 170, and to control the diffusion of the gas. The second pumping cell 150 is constituted by the third solid electrolyte member 151, the fifth electrode 152, and the sixth electrode 153.

The third solid electrolyte member 151 is disposed to confront the solid electrolyte member 105 through the insulating member 185. Moreover, the insulating member 185 is not disposed at a position at which the fifth electrode 152 is formed. The reference oxygen chamber 170 which is an independent space is formed at the position at which the fifth electrode 152 is formed. The first electrode 104 of the oxygen concentration sensing cell 130 is also disposed within this reference oxygen chamber 170. Besides, the porous material made from the ceramic is filled within the reference oxygen chamber 170.

Furthermore, the insulating member 185 is not disposed at a position at which the sixth electrode 153 is formed. The hollow second measuring chamber 160 which is an independent small space is formed at the position at which the sixth electrode 153 is formed, so as to sandwich the insulating member 185 with the reference oxygen chamber 170. Moreover, the solid electrolyte member 105 and the insulating member 180 include, respectively, opening portions 125 and 181 connected to the second measuring chamber 160. As described above, the measuring chamber 107 and the opening portion 181 are connected through the second diffusion resistance portion 117.

The second pumping cell 150 is arranged to pump the oxygen between the second measuring chamber 160 and the reference oxygen chamber 170 separated by the insulating member 185.

On the other hand, the heater section 200 includes a first base member 101 and a second base member 103 which are made mainly from the alumina; and a heating member 102 which is sandwiched by the first base member 103 and the second base member 103, and which is made mainly from platinum. The heating member 102 includes a heating portion (not shown) positioned on a tip end side; and a pair of heater lead portions (not shown) extending from the heating portion in a longitudinal direction of the first base member. End portions of the heater lead portions is electrically connected to electrode pads 304 and 305 (cf. FIGS. 4A and 4B) through through hole conductors provided to the first base member.

The NOx sensor element 100 is arranged to control the current flowing in the oxygen pumping cell 140 so that the output voltage of the oxygen concentration sensing cell 130 becomes constant, and thereby to perform the pumping. The exhaust gas whose the oxygen concentration is controlled in this way is introduced through the second diffusion resistance portion 117 to the second measuring chamber 160. The NOx concentration is sensed by measuring the current flowing in the second pumping cell 150 when the constant voltage is applied to the second pumping cell 150.

In particular, the exhaust gas within the second measuring chamber 160 are reduced (resolved) into N2 and O2 by using the sixth electrode 153 of the second pumping cell 150 as the catalyst. The reduced oxygen receives the electron from the sixth electrode 153 so as to become the oxygen ion. The oxygen ion flows within the third solid electrolyte member 151, and moves to the fifth electrode 152. At this time, the residual oxygen which is not pumped in the measuring chamber 107 is also moved to the reference oxygen chamber 170 by Ip2 cell 150. Accordingly, the current flowing in the Ip2 cell is the current derived from NOx and the current derived from the residual oxygen.

In this case, the concentration of the residual oxygen which is not pumped in the measuring chamber 107 is regulated to the predetermined value as described above. Accordingly, the current derived from the residual oxygen is considered as the substantially constant value. The current derived from the residual oxygen has small effect with respect to the variation of the current derived from NOx. The current flowing in the IP2 cell is proportional to the NOx concentration.

Next, the electrode pads 301 to 306 of the sensor element 100 which are characteristic portions according to the present invention are explained with reference to FIG. 3 to FIG. 5.

Figure 3:
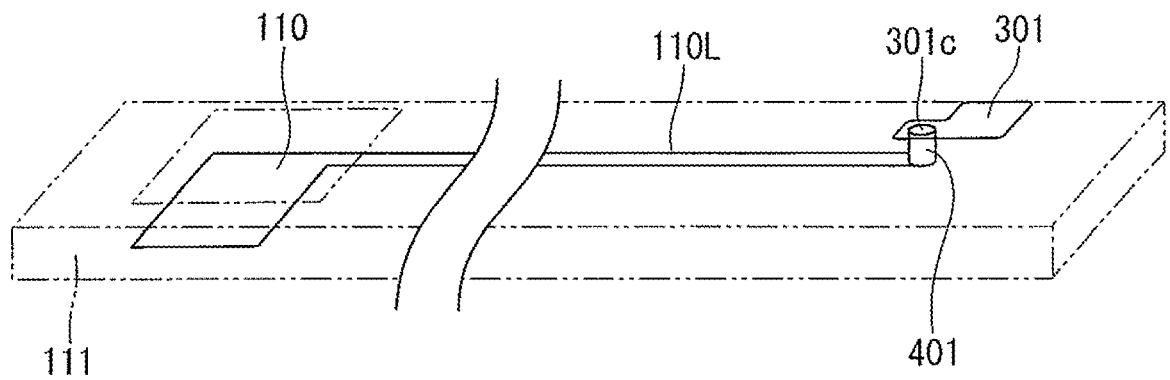
FIG. 3 is a schematic perspective view showing a configuration in which a through hole conductor is connected to an electrode pad.
Figures 4A, 4B:
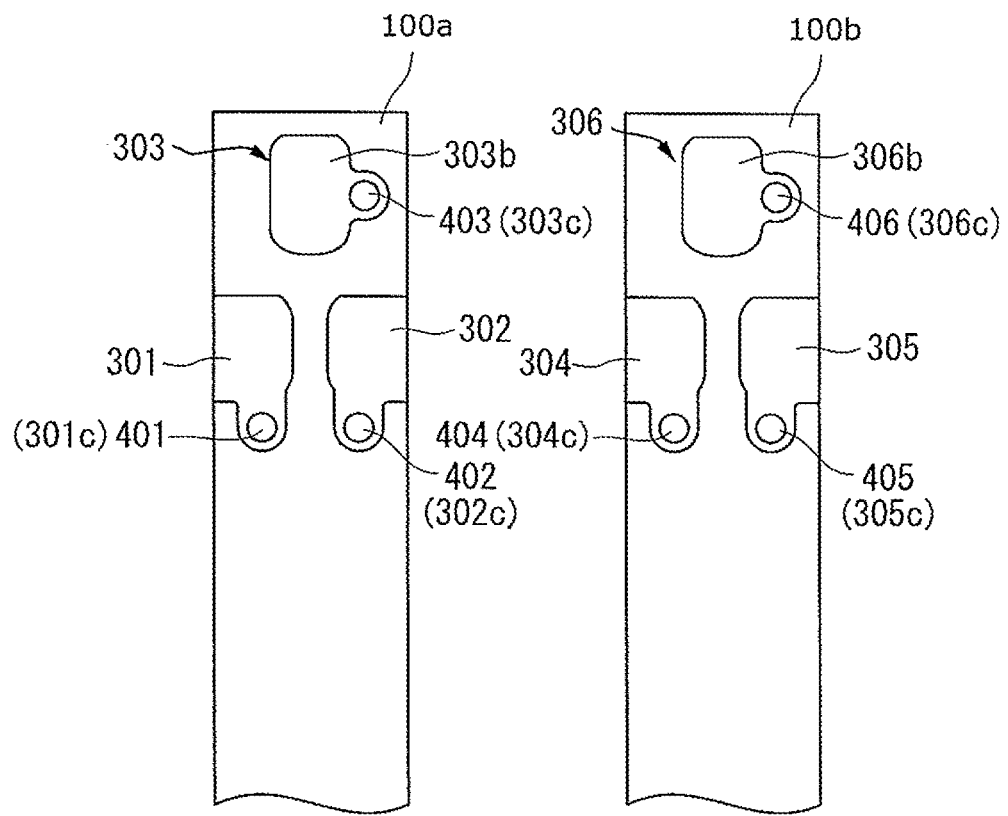
FIGS. 4A and 4B are plan views showing both main surfaces of the sensor element.

FIG. 3 is a schematic perspective view showing an embodiment in which a through hole conductor 401 is connected to an electrode pad 301. FIGS. 4A and 4B are plan views showing electrode pads 301 to 306 which are disposed on main surfaces 100a and 100b of the sensor element 100. FIG. 5 is a plan view showing three electrode pads 301 to 303 of the one surface 100a of the sensor element 100.

Besides, the through hole conductor is formed in the through hole that is formed in the sensor element 100, and which extends in a thickness direction of the sensor element 100.

As shown in FIG. 3, a lead portion 110L extends from the fourth electrode 110 toward the rear end side. An end of the lead portion 110L is connected to a through hole conductor 401 extending within the protection layer 111 in a thickness direction (in the lamination direction). The through hole conductor 401 extends to the surface of the protection layer 401. The electrode pad 301 is formed on the surface of the protection layer 111 to be overlapped with the through hole conductor 401.

The portion of the electrode pad 301 which is overlapped with the through hole conductor 401 is the connection portion 301c.

Besides, the conductive paste including, for example, Pt is printed on the protection layer 111 at a predetermined position. Then, the electrode pad 301 is formed by baking.

In the other electrodes 104, 106, 108, 152, and 153, and the pair of the heater lead portions, the corresponding electrode pads 302 to 306 are similarly connected through the through hole conductors to the respective lead portions.

Besides, as shown in FIGS. 4A and 4B, in this embodiment, in the one surface 100a of the sensor element 100, the respective electrodes 110 and 104 are connected through the through hole conductors 401 and 403 to the corresponding electrode pads 301 and 303.

Moreover, the respective electrodes 108 and 106 are connected through the through hole conductor 402 to a common electrode pad (earth (ground) electrode pad) 302.

Furthermore, in the opposite surface 100b of the sensor element 100, the electrode 152 is connected through the through hole conductor 406 to the corresponding electrode pad 306.

Moreover, the electrode 153 is connected through the through hole conductor 402 to the common electrode pad (earth (ground) electrode pad) 302.

On the other hand, the pair of the heater lead portions from the heating member 102 are connected, respectively, through the through hole conductors 404 and 405 to the corresponding electrode pads 304 and 305.

The connection portions 301c to 306c of the electrode pads 301 to 306 are the overlapping portions with the corresponding through hole conductors 401 to 406.

Next, three electrode pads 301 to 303 are explained with reference to the one surface 100a of the sensor element 100 shown in FIG. 5.

The three electrode pads 301 to 303 include a pad group 301 and 302 in which the two electrode pads 301 and 302 are arranged in the widthwise direction; and a single pad 303 disposed to be apart from a rear end 301e of the pad group 301 and 302 by a gap D. The single pad 303 is disposed on the rear end side of the pad group 301 and 302. There is the gap D between the pad group 301 and 302 and the single pad 303 in the direction of the axis O.

In the pad group 301 and 302, each of the electrode pads 301 and 302 has a substantially narrow rectangular shape extending in the direction of the axis O. Through hole conductors 401 and 402 are disposed at respective tip end portions of the electrode pads 301 and 302.

Accordingly, the connection portions 301c and 302c are formed, respectively, at the tip end sides of the electrode pads 301 and 302.

On the other hand, the single pad 303 includes a main body portion 303b having a substantially rectangular shape having a slightly long length in the direction of the axis O; and a connection portion 303c which is connected to the through hole conductor 403, and which is adjacent to a right side surface of the main body portion 303b.

The main body portion 303b has a width greater than a gap (clearance) between the pad group 301 and 302.

The connection portion 303c is integrally formed with the main body portion 303b at a portion near a center (at a substantially central portion) of the side surface of the main body portion 303b when viewed in the direction of the axis O, so as to receive (include) the through hole conductor 403. In this case, a boundary between the main body portion 303b and the connection portion 303c is a position at which a line parallel to the direction of the axis O is abutted on the through hole conductor 403 at an innermost position in a widthwise direction of the single pad 303 (a line AX in FIG. 5). Besides, in this embodiment, the main body portions of the pad group 301 and 302, and the main body portion 303b of the single pad 303 have the substantially identical area.

Moreover, in this embodiment, the through hole conductor 403 and the connection portion 303b are not overlapped with the center Ce of the sensor element 100 in the widthwise direction when viewed in the widthwise direction of the single pad 303. That is, the connection portion 303c is positioned closer to the widthwise rend portion side than the center Ce in the widthwise direction.

Moreover, a shorter one of the lengths of the pad groups 301 and 302 in the direction of the axis O is represented by L1. The length of the single pad 303 in the direction of the axis O is represented by L2. In this embodiment, L1>L2 is satisfied. Each of the lengths L1 and L2 is an entire length of one of the electrode pads including the connection portions.

Figure 5:
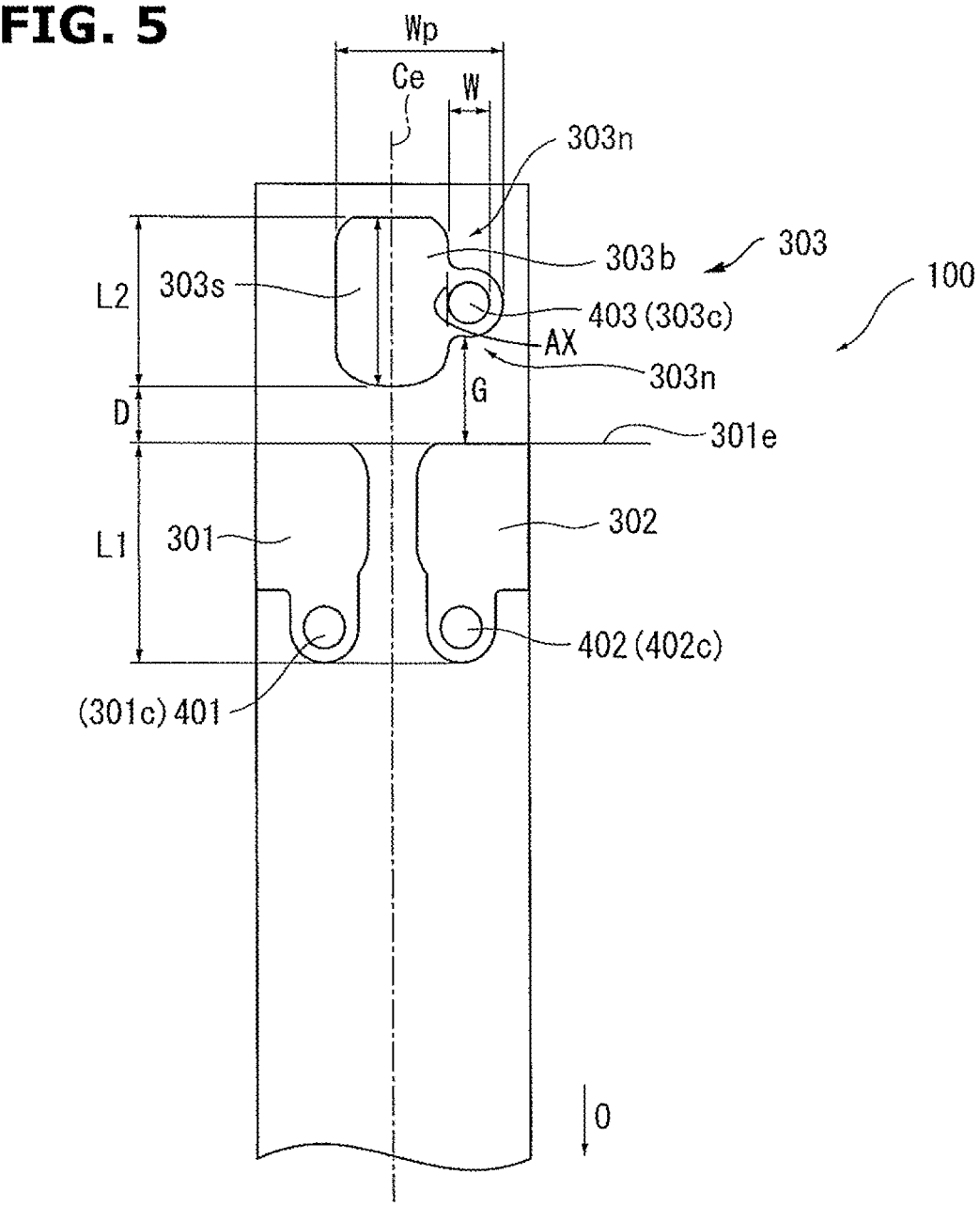
FIG. 5 is a plan view showing three electrode on one surface of the sensor element.

Furthermore, in in the example of FIG. 5, the lengths of the electrode pads 301 and 302 are the same length in the direction of the axis O.

In this way, even when the electrode pads 301 and 303 are arranged in the lengthwise direction in the direction of the axis O, in the single pad 303, the connection portion 303c connected to the through hole conductor 403 formed within the through hole of the sensor element 100 is adjacent to the side surface of the main body portion 303b. Accordingly, it is possible to suppress the generation of the waste space in the direction of the axis O by protruding the connection portion 303c which does not effectively function, in the forward and rearward directions of the main body portion 303b. Moreover, it is possible to attain the length decrease and the size decrease of the sensor element 100.

Furthermore, as shown in FIG. 5, in this embodiment, in the single pad 303, the connection portion 303c is positioned at a middle of the side surface of the main body portion 303b in the direction of the axis O.

The connection portion 303c is connected to the through hole conductor 403. Accordingly, in a case where the connection portion 303c is positioned at the middle on the side surface of the main body portion 303b in the direction of the axis O, the connection portion 303c is easy to be connected to the through hole conductor 403 even when the position of the connection portion 303c is deviated, relative to a case where the connection portion 303c is positioned on the tip end surface or the rear end surface of the main body portion 303b. Moreover, as described above, the connection portion 303c does not effectively serve as the electrode. Accordingly, the portion overlapped with the connection portion 303c in the direction of the axis O becomes the cutaway portions 303n, so as to decrease the area of the single pad 303. With this, it is possible to decrease the usage amount of Pt and so on which is used for the single pad 303, and thereby to decrease the cost.

Besides, the cutaway 303n may be formed in the forward or rearward portions which is overlapped with the connection portion 303c in the direction of the axis O.

Moreover, as shown in FIG. 5, a width of the connection portion 303c of the single pad 303 in the widthwise direction is represented by W. An overall width of the single pad 303 in the widthwise direction is represented by Wp. Wp<3.1×W may be satisfied.

In case of Wp<3.1×W, it is possible to relatively decrease Wp to be smaller than W. With this, it is possible to decrease the usage amount of Pt and so on which is used for the single pad 303, by that amount, and to further decrease the cost.

Furthermore, in this embodiment, L1>L2 is satisfied. With this, even when the electrode pads 301 and 302 are arranged in the lengthwise direction in the direction of the axis O of the sensor element 100, the overall length of the electrode pads 301 and 302 becomes shorter than the overall length of the electrode pads 301 and 302 in case of L1=L2. Accordingly, it is possible to further decrease the length and the size of the sensor element 100.

Furthermore, it is preferable that the distance between the pad groups 301 and 302 and the single pad 303 in the direction of the axis O, that is, the gap (clearance) D between the rear end 301e of the pad group 301 and 302 and the tip end of the single pad 303 which is shown in FIG. 5 is greater than 0.2×the corresponding radius of the through hole 403 of the single pad 303.

With this configuration, even when the through hole conductor 403 is dispersed around the through hole, it is possible to further suppress the short-circuit of the through hole conductor 403 with the pad group 301 and 302.

Besides, the corresponding radius is a radius of the corresponding circle of the through hole 403 of the element surface on which the single pad 303 is formed. The corresponding radius does not include the through hole 403 inside the element.

Next, a sensor element according to a second embodiment of the present invention is explained with reference to FIG. 6. Besides, the sensor element according to the second embodiment of the present invention has a configuration identical to that of the sensor element according to the first embodiment of the present invention, except for the configuration of the single pad 313. Accordingly, the explanation of the configuration which is other than the single pad 313 is omitted.

Figure 6:
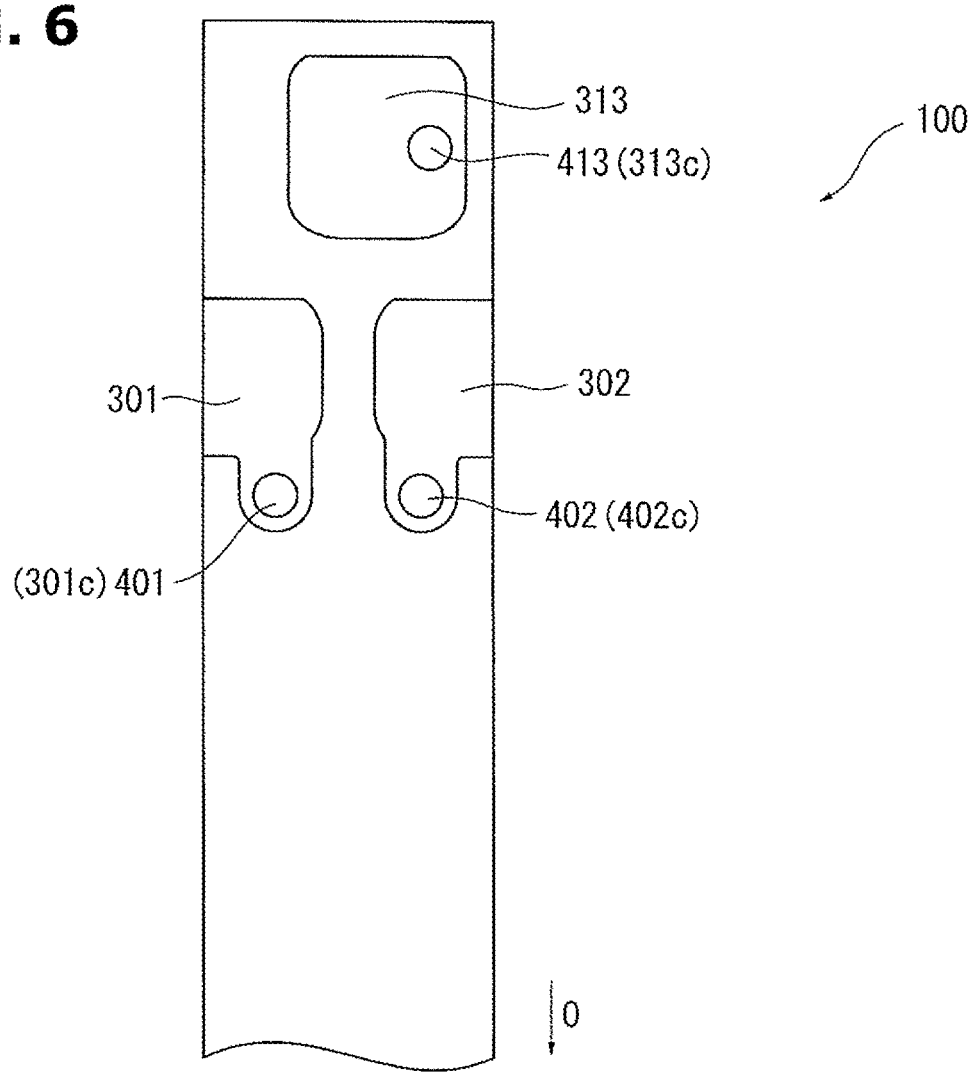
FIG. 6 is a plan view showing an electrode pad according to a second embodiment of the present invention.
Figure 7:
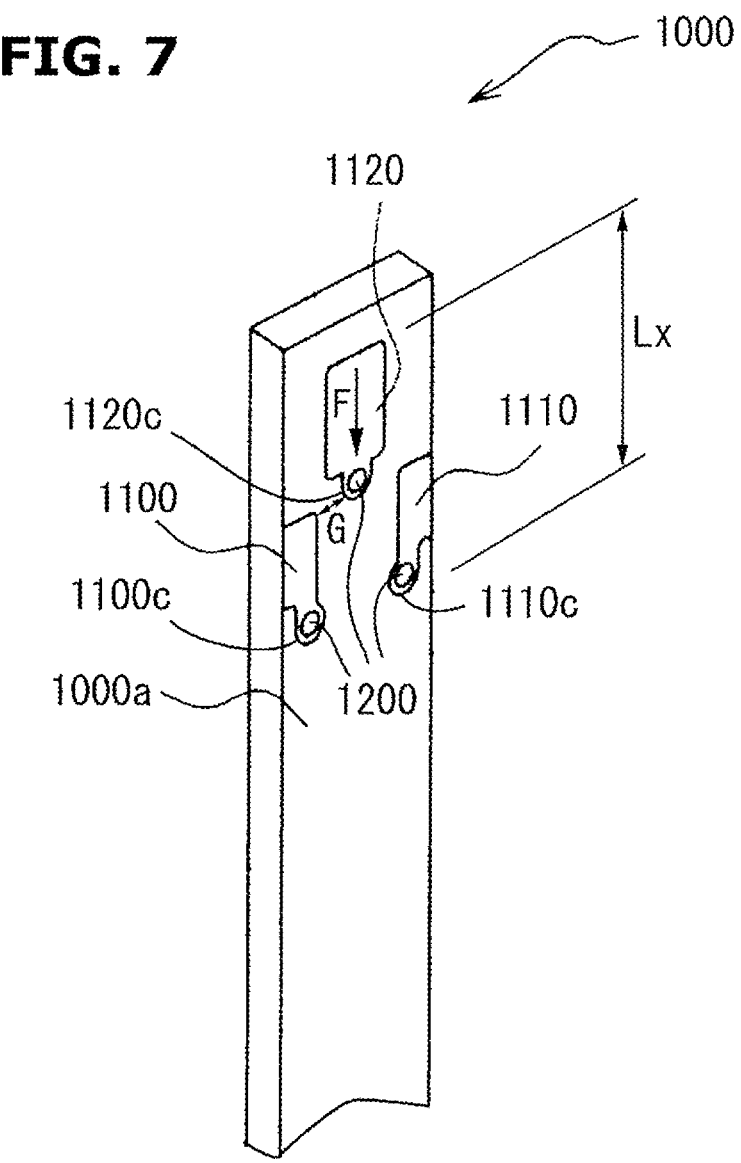
FIG. 7 is a partial perspective view showing three electrode pads on one surface of a conventional sensor element.

As shown in FIG. 6, the single pad 313 has a rectangular shape having a longer length in the direction of the axis O. The single pad 313 is connected to the through hole conductor 413 on a right side of the single pad 313 at the middle in the direction of the axis O, so as to receive the through hole conductor 413.

A shorter one of the lengths of the electrode pads of the pad group 301 and 302 in the direction of the axis O is represented by L1. A length of the single pad 313 in the direction of the axis O is represented by L2. L1>L2 is satisfied. The through hole (through hole conductor 413) is not overlapped with the center of the single pad 313 in the widthwise direction.

In the sensor element according to the second embodiment of the present invention, even when the electrode pads 301 and 302 are arranged in the lengthwise direction in the direction of the axis O of the sensor element 100, the portion of the single pad 313 which is connected to the through hole conductor 413 formed in the through hole of the sensor element 100 is received within the single pad 313. Accordingly, it is possible to suppress the generation of the waste space in the direction of the axis O by protruding the connection portion of the through hole conductor 413 which does not effectively function as the electrode, in the forward or rearward direction of the single pad 313. Consequently, it is possible to decrease the length and the size of the sensor element 100.

Moreover, in a case where the through hole (the through hole conductor 413) is not overlapped with the center of the single pad 313 in the widthwise direction, the connection portion with the through hole conductor 413 does not exist on the surface of the single pad 313 near the center in the widthwise direction. It is possible to use the entire of the single pad 313 as the effective length which is surely contacted on the connection terminal 16, and thereby to decrease L2 by that amount.

The present invention is not limited to the above-described embodiments. The present invention is applicable to any gas sensors (sensor elements) including the sensor element having at least three electrode pads provided on one surface. For example, the oxygen pump cell, the oxygen concentration sensing cell, and the heater can be applied to the oxygen sensor (the oxygen sensor element) according to the embodiments. The present invention is not limited to these usages. The present invention are applied to various variations and equivalents which are included in the thoughts and the ranges of the present invention. For example, the present invention may be applied to NOx sensor (NOx sensor element) arranged to sense NOx concentration in the sensed gas.

The single pad may be disposed at the tip end side of the pad group to be apart from the pad group. The shapes of the single pad and the pad group, and the position of the connection portion (the through hole conductor and so on) in the single pad are also not limited to the above-described embodiments. The sectional shapes of the through hole and so on are not limited to the above-described embodiments.

In case of the via hole conductor which is filled within the via hole in place of the through hole conductor 1200, it is identical.

According to one aspect of the present invention, a sensor element which extends in a plate shape in a direction of an axis, and which has a first main surface and a second main surface, the sensor element includes: three electrode pads (301-306) provided on at least the first main surface, and electrically connected to a connection terminal (16), the three electrode pads including; a pad group including two electrode pads of the three electrode pads which are arranged in a widthwise direction of the sensor element, and a single pad which is provided on a tip end side or rear end side of the pad group, and which is not overlapped with the pad group when viewed in a widthwise direction, the single pad includes a connection portion which is connected to a conductor formed within a through hole extending within the sensor element in a thickness direction, and which is adjacent to a side surface of the main body portion.

In this sensor element, even when the electrode pads are arranged in the longitudinal direction in the direction of the axis O of the sensor element, the connection portion of the single pad which is connected to the conductor formed within the through hole of the sensor element is adjacent to the side surface of the single pad. Accordingly, it is possible to suppress the generation of the waste space in the direction of the axis by protruding the connection portion 303c which does not effectively function, in the forward and rearward directions of the main body portion. Moreover, it is possible to attain the length decrease and the size decrease of the sensor element.

According to another aspect of the present invention, the connection portion may be positioned at a middle of the side surface of the main body portion in the direction of the axis.

The connection portion is connected to the conductor formed within the through hole of the sensor element. Accordingly, even when the connection portion is deviated, the connection portion is easy to be connected to the conductor, relative to a case where the connection portion is positioned on the tip end surface or the rear end surface of the main body portion.

According to another aspect of the present invention, the sensor element satisfies Wp<3.1×W where W is a width of the connection portion of the single pad, and Wp is a width of the single pad.

With this, it is possible to decrease WP relative to W by satisfying Wp<3.1×W. Moreover, it is possible to decrease usage amount of Pt and so on which are used for the single pad, by that amount.

According to another aspect of the present invention, the sensor element satisfies L1>L2 where L1 is a shorter one of the widths of the electrode pads of the pad group in the direction of the axis, and L2 is a length of the single pad in the direction of the axis.

In this sensor element, L1>L2 is satisfied. With this, even when the electrode pads are arranged in the longitudinal direction in the direction of the axis O, it is possible to further attain the length reduction and the size reduction of the sensor element, relative to a case where an overall length of the electrode pad satisfies L1=L2.

According to the another aspect of the present invention, a sensor element which extends in a plate shape in a direction of an axis, and which has a first main surface and a second main surface, the sensor element including: three electrode pads (301-306) provided on at least the first main surface, and electrically connected to a connection terminal (16), the three electrode pads including; a pad group including two electrode pads of the three electrode pads which are arranged in a widthwise direction of the sensor element, and a single pad which is provided on a tip end side or rear end side of the pad group, and which is not overlapped with the pad group when viewed in a widthwise direction, the single pad including which has a width greater than a clearance between the two electrode pads of the pad group, and which is connected to a conductor formed within a through hole extending within the sensor element in a thickness direction, wherein the sensor element satisfies L1>L2 where L1 is a shorter one of the widths of the electrode pads of the pad group in the direction of the axis, and L2 is a length of the single pad in the direction of the axis, and wherein the through hole is not overlapped with a center of the single pad in the widthwise direction.

In this sensor element, even when the electrode pads are arranged in the longitudinal direction in the direction of the axis O of the sensor element, the connection portion of the single pad which is connected to the conductor formed within the through hole of the sensor element is adjacent to the side surface of the single pad. Accordingly, it is possible to suppress the generation of the waste space in the direction of the axis by protruding the connection portion 303c which does not effectively function, in the forward and rearward directions of the main body portion. Moreover, it is possible to attain the length decrease and the size decrease of the sensor element.

Moreover, the through hole is not overlapped with the middle of the single pad in the widthwise direction. There is no connection portion with the conductor on the surface of the single pad near the middle of the widthwise direction. Accordingly, it is possible to use the entire single pad as effective length for sure connection with the connection terminal, and thereby to decrease L2 by that length.

According to the another aspect of the present invention, the conductor may be formed within the through hole.

According to the another aspect of the present invention, the through hole is a via hole; and the conductor is filled within the via hole.

According to the another aspect of the present invention, a gas sensor includes a sensor element having one of the above-described features, and a main shell supporting the sensor element.

By the present invention, in a case where the sensor element includes at least three electrode pads on one surface, it is possible to attain the size reduction of the element, to ensure reliability of the electric connection between the electrode pads and the connection terminal, and to suppress the short-circuit between the electrode pads.

The entire contents of Japanese Patent Application No. 2018-096780 filed May 21, 2018 and Japanese Patent Application No. 2019-018400 filed Feb. 5, 2019 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A sensor element which extends in a plate shape in a direction of an axis O, and which has a first main surface and a second main surface, the sensor element comprising:
   three electrode pads provided on at least the first main surface, and electrically connected to a connection terminal,
   the three electrode pads including;
      a pad group including two electrode pads of the three electrode pads which are arranged in a widthwise direction of the sensor element, and
      a single pad which is provided on a tip end side or rear end side of the pad group, and which is not overlapped with the pad group when viewed in a widthwise direction,
   the single pad including a main body portion which has a width greater than a clearance between the two electrode pads of the pad group, which is electrically connected to the connection terminal, and a connection portion which is connected to a conductor formed within a through hole extending within the sensor element in a thickness direction, and which is adjacent to a side surface of the main body portion.

2. The sensor element as claimed in claim 1, wherein the connection portion is positioned at a middle portion of the side surface of the main body portion in the direction of the axis.

3. The sensor element as claimed in claim 1, wherein the sensor element satisfies Wp<3.1×W where W is a width of the connection portion of the single pad, and Wp is a width of the single pad.

4. The sensor element as claimed in claim 1, wherein the sensor element satisfies L1>L2 where L1 is a shorter one of the widths of the electrode pads of the pad group in the direction of the axis, and L2 is a length of the single pad in the direction of the axis.

5. The sensor element as claimed in claim 1, wherein the conductor is formed within the through hole.

6. The sensor element as claimed in claim 1, wherein the through hole is a via hole; the conductor is filled within the via hole.

7. A sensor element which extends in a plate shape in a direction of an axis O, and which has a first main surface and a second main surface, the sensor element comprising:
   three electrode pads provided on at least the first main surface, and electrically connected to a connection terminal,
   the three electrode pads including;
      a pad group including two electrode pads of the three electrode pads which are arranged in a widthwise direction of the sensor element, and
      a single pad which is provided on a tip end side or rear end side of the pad group, and which is not overlapped with the pad group when viewed in a widthwise direction,
   the single pad including which has a width greater than a clearance between the two electrode pads of the pad group, and which is connected to a conductor formed within a through hole extending within the sensor element in a thickness direction,
   wherein the sensor element satisfies L1>L2 where L1 is a shorter one of the widths of the electrode pads of the pad group in the direction of the axis, and L2 is a length of the single pad in the direction of the axis, and
   wherein the through hole is not overlapped with a center of the single pad in the widthwise direction.

8. A gas sensor comprising:
   a sensor element which extends in a plate shape in a direction of an axis O, and which has a first main surface and a second main surface; and
   a main shell supporting the sensor element,
the sensor element comprising:
   three electrode pads provided on at least the first main surface, and electrically connected to a connection terminal,
   the three electrode pads including;
      a pad group including two electrode pads of the three electrode pads which are arranged in a widthwise direction of the sensor element, and
      a single pad which is provided on a tip end side or rear end side of the pad group, and which is not overlapped with the pad group when viewed in a widthwise direction,
   the single pad including a main body portion which has a width greater than a clearance between the two electrode pads of the pad group, which is electrically connected to the connection terminal, and a connection portion which is connected to a conductor formed within a through hole extending within the sensor element in a thickness direction, and which is adjacent to a side surface of the main body portion.

9. A gas sensor comprising:
   a sensor element which extends in a plate shape in a direction of an axis O, and which has a first main surface and a second main surface; and
   a main shell supporting the sensor element,
the sensor element including:
   three electrode pads provided on at least the first main surface, and electrically connected to a connection terminal,
   the three electrode pads including;
      a pad group including two electrode pads of the three electrode pads which are arranged in a widthwise direction of the sensor element, and
      a single pad which is provided on a tip end side or rear end side of the pad group, and which is not overlapped with the pad group when viewed in a widthwise direction,
   the single pad including which has a width greater than a clearance between the two electrode pads of the pad group, and which is connected to a conductor formed within a through hole extending within the sensor element in a thickness direction,
   wherein the sensor element satisfies L1>L2 where L1 is a shorter one of the widths of the electrode pads of the pad group in the direction of the axis, and L2 is a length of the single pad in the direction of the axis, and
   wherein the through hole is not overlapped with a center of the single pad in the widthwise direction.

* * * * *